United States Patent
Chen

(10) Patent No.: US 7,715,014 B2
(45) Date of Patent: May 11, 2010

(54) METHODS AND SYSTEMS FOR FIBER OPTIC GYROSCOPES VIBRATION ERROR SUPPRESSION

(75) Inventor: Chung-Jen Chen, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 461 days.

(21) Appl. No.: 11/682,669

(22) Filed: Mar. 6, 2007

(65) Prior Publication Data

US 2008/0218764 A1 Sep. 11, 2008

(51) Int. Cl.
*G01C 19/72* (2006.01)
(52) U.S. Cl. .................................................. 356/464
(58) Field of Classification Search ................. 356/460, 356/461, 464, 466
See application file for complete search history.

(56) References Cited

U.S. PATENT DOCUMENTS

| | | | | |
|---|---|---|---|---|
| 5,452,086 | A | * | 9/1995 | Bunn ........................ 356/477 |
| 5,610,714 | A | * | 3/1997 | Malvern et al. ............. 356/463 |
| 5,923,424 | A | | 7/1999 | Sanders et al. |
| 5,926,275 | A | | 7/1999 | Sanders et al. |
| 5,946,097 | A | | 8/1999 | Sanders et al. |
| 6,429,939 | B1 | * | 8/2002 | Bennett et al. ............. 356/463 |
| 6,744,519 | B2 | | 6/2004 | Lange et al. |

* cited by examiner

*Primary Examiner*—Patrick J Connolly
(74) *Attorney, Agent, or Firm*—Fogg & Powers LLC

(57) ABSTRACT

Systems and methods for performing vibration error suppression in a fiber optic gyro sensor. An example system includes a light source, a sensing loop assembly, a photo detector, and a processing component. The light source generates a light signal that is then modulated by the sensing loop assembly and applied to a fiber optic coil in the assembly. The photo detector receives a modulated light signal that is an output of the sensing loop assembly (coil) and generates an analog signal. The processing component converts the generated analog signal into a modulated digital signal, determines an average of the modulated digital signal, determines an intensity modulation amplitude based on the determined average of the modulated digital signal, and re-scales the modulated digital phase signal based on the determined intensity modulation amplitude.

4 Claims, 6 Drawing Sheets

METHODS AND SYSTEMS FOR FIBER OPTIC GYROSCOPES VIBRATION ERROR SUPPRESSION

GOVERNMENT INTEREST

The invention described herein was made in the performance of work under U.S. Government Contract No. F29601003-C-0124, Air Force Research Laboratory (AFRL). The Government may have rights to portions of this invention.

BACKGROUND OF THE INVENTION

In recent years fiber optic gyroscopes (FOGS) have become widely used in several technologies to sense the rotation and angular orientation of various objects, such as aerospace vehicles. A FOG typically includes an optical fiber, often several kilometers in length, wound in a coil about an axis of rotation (i.e., the rotation to be sensed). Light is injected in opposite directions through the coil and directed onto a photo detector. If the coil is rotated about the axis, the effective optical path length for the light traveling in one direction in the coil is increased, while the path length is decreased for the light traveling in the opposite direction (See FIG. 1).

The difference in path length introduces a phase shift, known as the Sagnac Effect, between the light waves traveling in opposite directions. As a result, an interference pattern is detected by the photo detector, which indicates that the FOG is experiencing rotation. The output signal from the photo detector typically follows a cosine function. That is, the output signal depends on the cosine of the phase difference between the two waves. Therefore, because the cosine function is even, the rate of change near zero is very small, resulting in poor sensitivity for low rotation rates. To improve sensitivity, the waves are often modulated by a particular voltage to generate a phase difference deviating from zero. The actual phase generated by the modulation voltage is referenced to a voltage $V_\pi$ that changes the light phase by 180° (or $\pi$ radians). The phase modulation reference voltage $V_\pi$ depends on the wavelength and environmental factors, such as temperature, humidity, and pressure.

The amplitude of the Sagnac phase shift caused by a rotation rate determines the FOG "scale factor," which numerically relates the detected phase difference to the actual rotation being experienced by the FOG. As the fiber sensing coil length and diameter are increased, the scale factor also increases, and as a result, the FOG is more sensitive to rotation. The FOG scale factor also depends on the wavelength of the light propagating in the fiber sensing coil.

In the Interferometric Fiber Optic Gyroscope (IFOG), vibration can cause intensity fluctuation through components in the optical signal path. Vibration also causes phase fluctuation through physical rotation of the IFOG sensing coil. Rectified bias error is generated when the intensity and phase modulations are synchronous. Both Navy Submarine Launched Ballistic Missile (SLBM) and Air Force Intercontinental Ballistic Missile (ICBM) guidance programs require IFOG to exhibit minimal rectified bias error under severe vibration environmental situations, such as during booster phase and stages separation (see FIGS. 2 and 3).

Therefore, there exists a need for a technique to suppress vibration-induced intensity modulation and thus reduce the vibration-induced bias error.

SUMMARY OF THE INVENTION

The present invention provides systems and methods for performing vibration error suppression in a fiber optic gyro sensor. An example system includes a light source, a sensing loop assembly, a photo detector, and a processing component. The light source generates a light signal that is applied to a fiber optic coil in the assembly. Light intensity in the optical path of an FOG is modulated in the presence of vibration source. The photo detector receives a modulated light signal containing both modulated intensity and phase signals that is an output of the sensing loop assembly (coil) and generates an analog signal. The processing component converts the generated analog signal into a modulated digital signal, which determines an intensity modulation amplitude based on the determined average of the modulated digital signal. The modulated intensity amplitude is then used to rescale the modulated phase signal to eliminate vibration-induced rotation rate error.

In one aspect of the present invention, the processor component generates an analog modulation signal based on the rescaled modulated digital signal and controls the sensing loop assembly based on the generated analog modulation signal.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
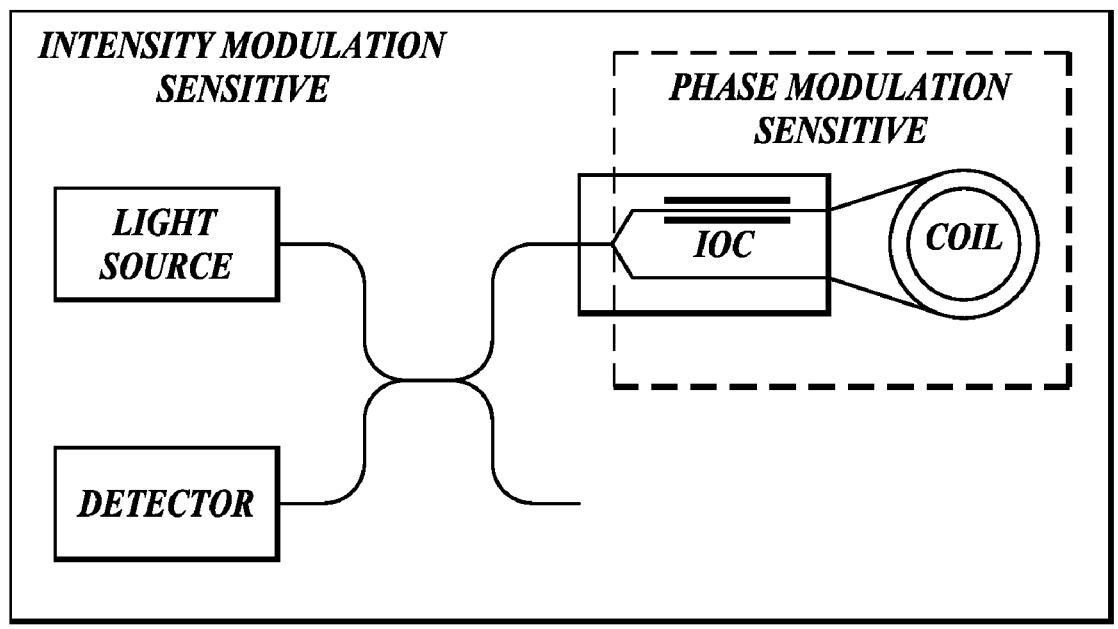
FIG. 1 is a schematic drawing illustrating the prior art.
Figure 2:
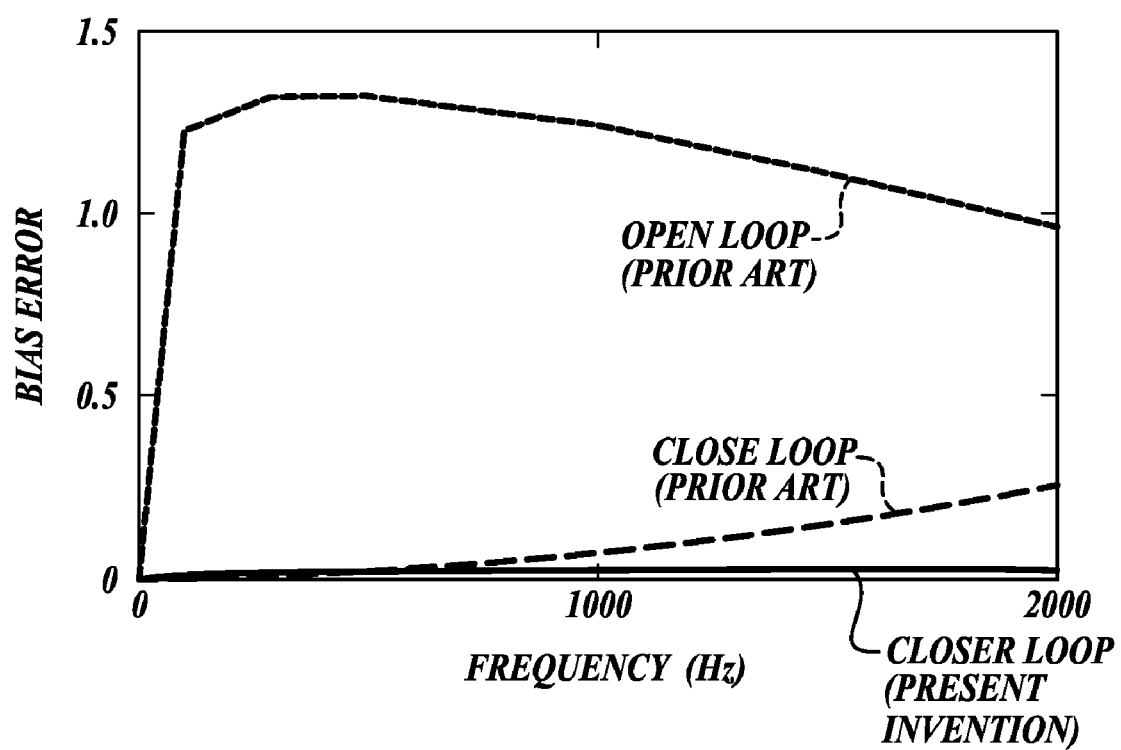
FIG. 2 is a graph illustrating vibration error produced by the prior art and by the present invention.
Figure 3:
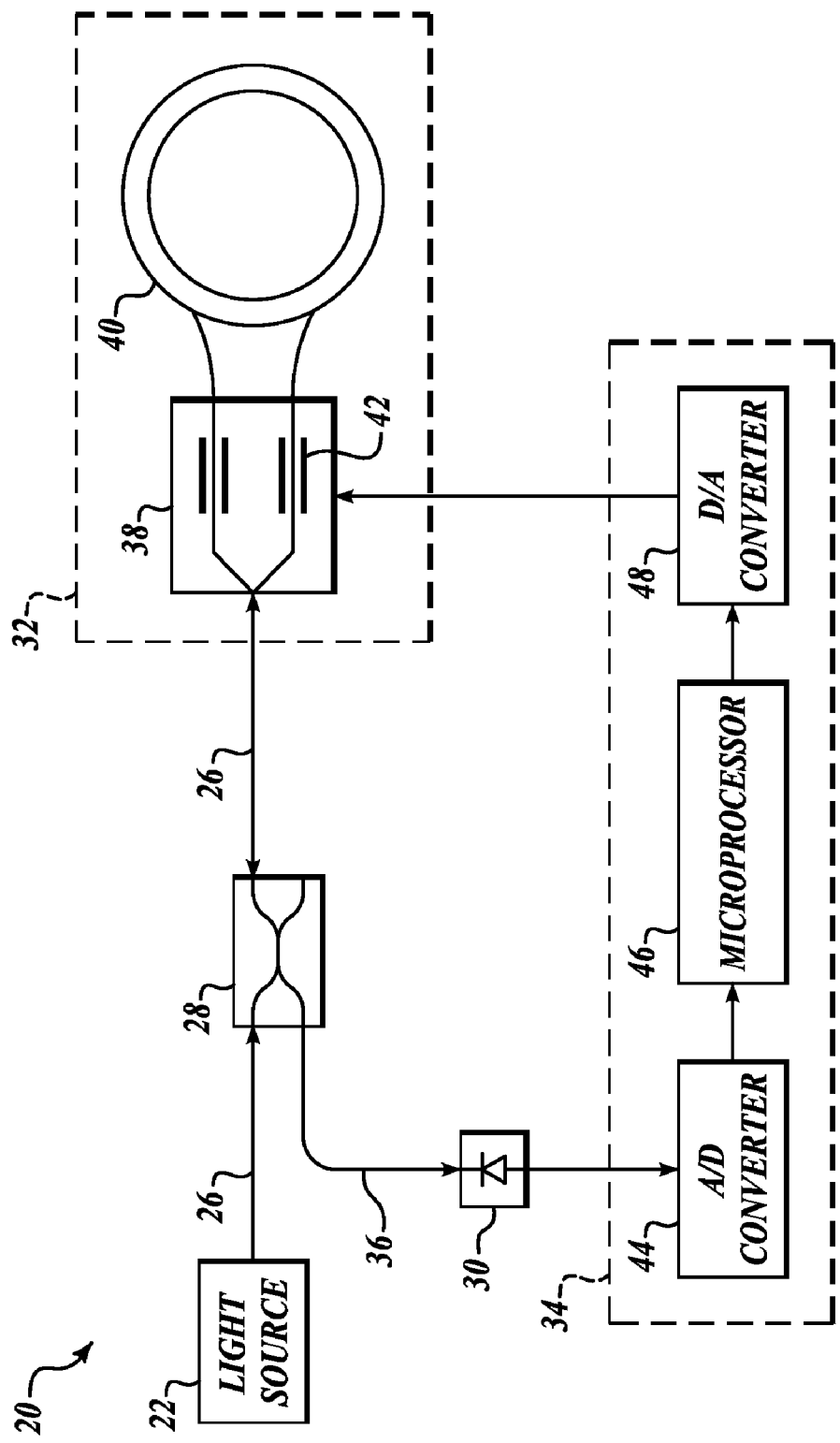
FIGS. 3 and 4 are schematic drawings of an example system formed in accordance with the present invention.

FIG. 3 illustrates a fiber optic gyroscope system 20 formed according to one embodiment of the present invention. The system 20 includes a light source 22, an optical coupler 28, a photo detector 30, a sensing loop assembly 32, a processing subsystem 34, and fiber optic lines 26, 36 interconnecting various components of the system 20.

The light source 22 is any light source typically used in fiber optic gyroscopes, such as a Fiber Light Source (FLS) assembly. In one embodiment, the light source includes a 980 nm semiconductor pump laser containing an Erbium doped fiber (EDF) capable of generating light with a wavelength of approximately 1532 nm with an approximate bandwidth of 35 nm.

In the depicted embodiment, the optical coupler 28 is a 50/50 coupler, or splitter, as is commonly understood in the art. The coupler 28 is coupled, via the fiber optic lines 26, to the light source 22, the photo detector 30, and to the sensing loop assembly 32. The coupler 28 receives light from the light source 22 thereof and splits the light amongst at least two other terminals (i.e., outputs). Light that is sent from the light source 22 through the coupler 28 will be split into two "parts," with one part being sent to the sensing loop assembly 32 and the other part not being used. Light that is traveling in the opposite direction (i.e., back from the sensing loop assembly 32) is split such that one part is sent back to the photo detector 30. The photo detector 30 is connected between the coupler 28 and the processing subsystem 34 and may include a photodiode.

The sensing loop assembly 32 includes an integrated optics chip (IOC) 38 and a fiber sensing coil 40. The IOC 38 is an electro-optic crystal phase modulator, as is commonly understood. The IOC 38 includes a "Y" splitter connected to the coupler 28 through the fiber optic line 26 and a series of electrodes 42. The Y splitter splits the light from the fiber optic line 26 into fiber optic segments within the fiber coil 40, and the electrodes 42 are used to modulate the split light. Although the present invention may be practiced with various types of phase modulators, in one embodiment, the IOC 38 uses "square wave" bias modulation and is fabricated using $LiNbO_3$. The fiber sensing coil 40 is a winding of fiber optical cable having a length of, for example, between 1 and 6 km.

The processing subsystem 34 includes electronic components, including various circuitry and integrated circuits, such as a field programmable gate array (FPGA), an Application Specific Integration Circuit (ASIC), and/or instructions stored on a computer readable medium to be carried out by a computing system and perform the methods and processes described below. The processing subsystem 34 includes an analog-to-digital converter (ADC) 44, a microprocessor 46, and a digital-to-analog converter (DAC) 48. The ADC 44 converts the analog signal received from the photo detector 30 into digital data representative thereof and supplies the digital data to the microprocessor 46. The DAC 48 is sequentially connected to an output of the microprocessor 46. The DAC 48, as is generally known, converts digital data supplied from the microprocessor 46 into analog signals representative thereof. An output of the DAC 48 is connected to the IOC 38 within the sensing loop assembly 32. The microprocessor 46 is coupled between the ADC 44 and the DAC 48.

Figure 4:
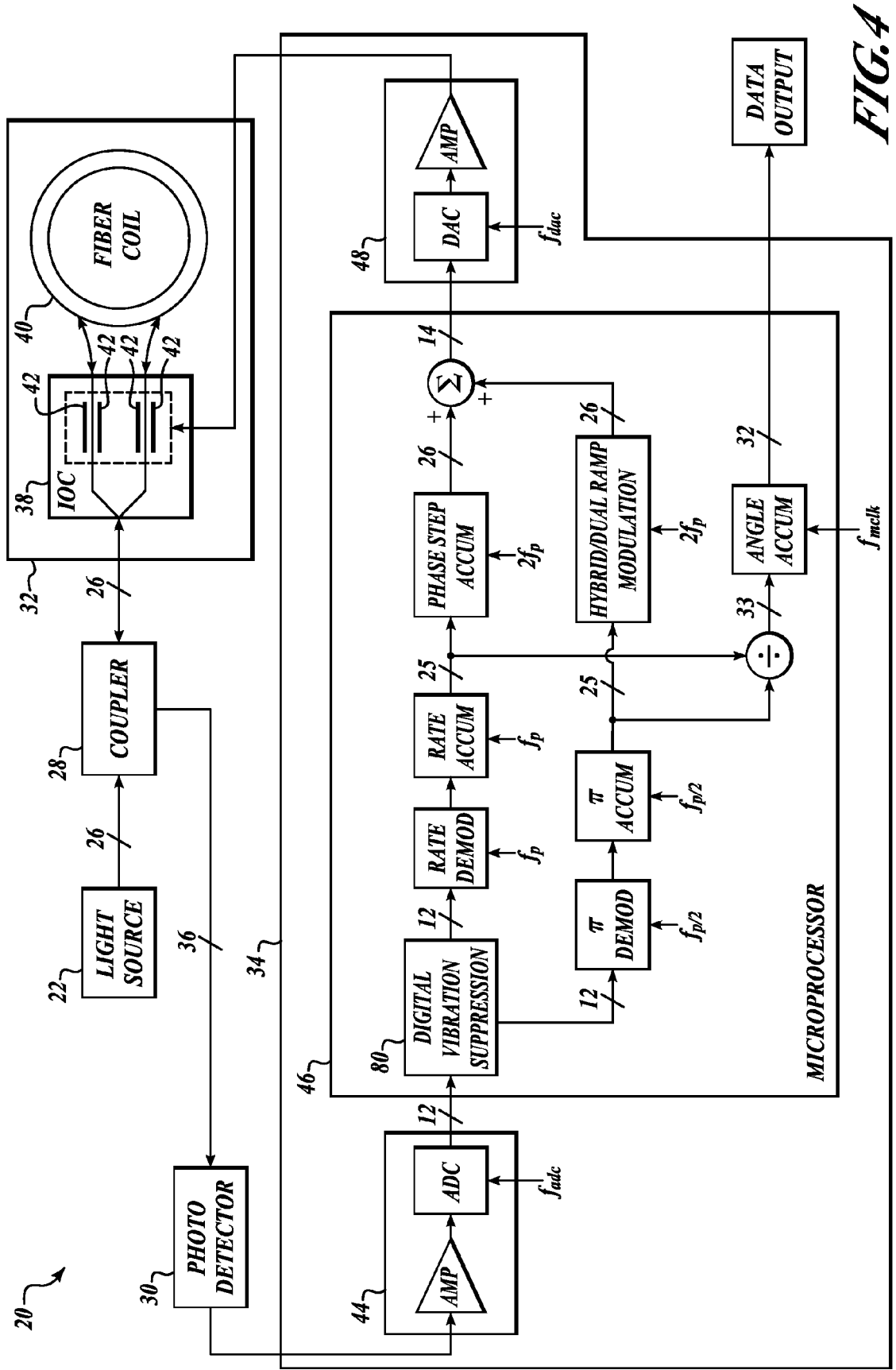

In one embodiment as shown in FIG. 4, the ADC 44 includes an amplifier and an ADC. The microprocessor 46 includes a digital vibration suppression component 80 that is in data communication with the ADC. The digital vibration suppression component 80 determines intensity fluctuation due to vibration. The intensity fluctuation due to vibration is an AC intensity signal that is obtained from the summation of two adjacent voltage levels. Then, the digital vibration suppression component 80 reduces vibration-induced bias error based on the determined vibration intensity fluctuation (i.e., intensity modulation). The digital vibration suppression component 80 outputs its results to rate and π demodulators. The rest on the processing performed in the microprocessor 46 is performed in accordance with known digital signal processing techniques.

Figure 5:
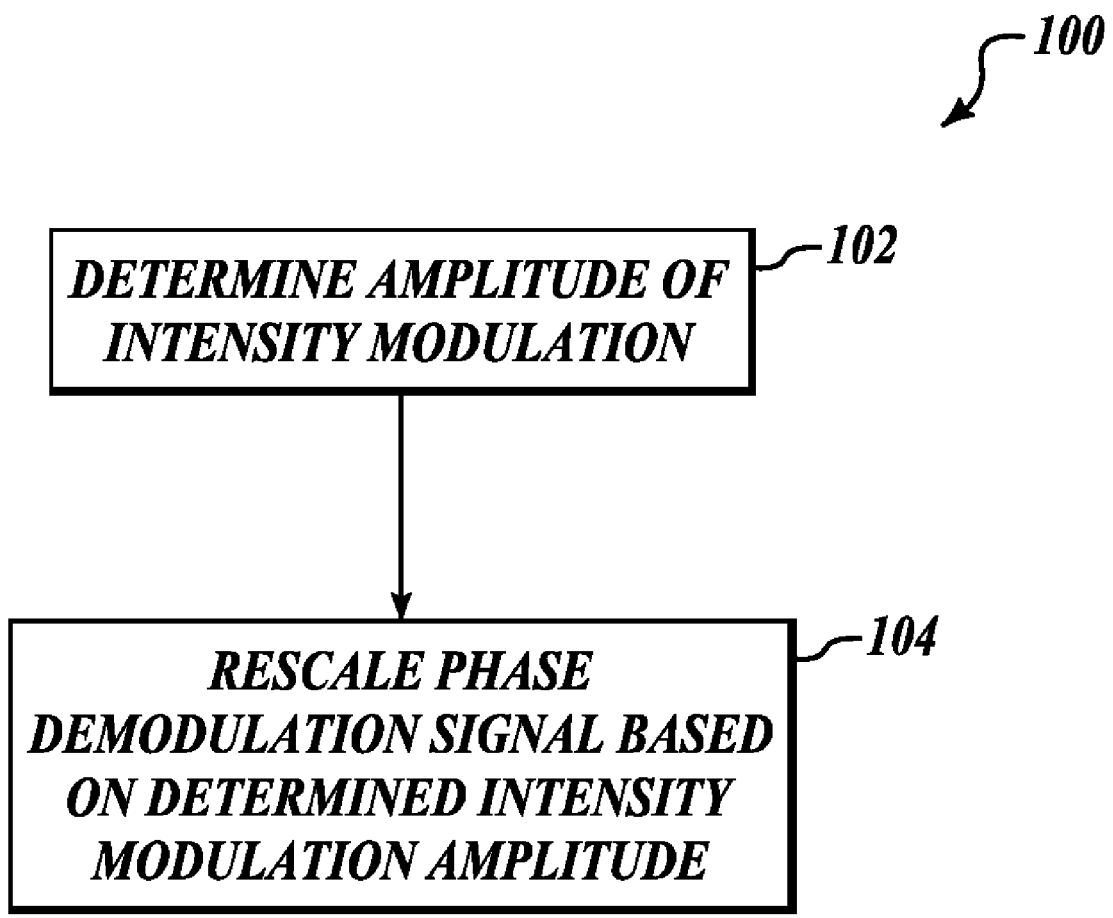
FIG. 5 illustrates a flowchart of an example process performed by the system shown in FIGS. 3 and 4.

As shown in FIG. 5, an example process 100 is performed by the digital vibration suppression component 80. First, at block 102, the amplitude of intensity modulation is determined using the average of the demodulation signal.

Equation 1 is the signal at the photo detector 30 with Intensity and Phase Modulation:

$$V(\Delta\phi_m) = \frac{V_o}{2}(1+a)[1+\cos(\Delta\phi_m + \beta)] \quad (1)$$

α: Intensity Modulation
β: Phase Modulation
$\Delta\phi_m$: Modulation Depth
$V_o$: Un-modulated DC Voltage Intensity modulation in Equation 1 is induced in the presence of a vibration source. Phase modulation comes from the actual gyro rotation or vibration. In one embodiment in FIG. 4, a square phase modulation is applied to IOC 38 to generate a bias to detect change of rotation rate. Frequency of the square wave depends on the length of fiber coil 40. Loop transit time (τ) is defined as the time required for light to travel from on end of fiber coil to the other.

Digital Processing inside the digital vibration suppression component 80 consists of sum and difference of two signals in adjacent loop transit time $$V_{AVG} = \frac{V_o}{2}[V(-\Delta\phi_m) + V(\Delta\phi_m)] = \frac{V_o}{2}(1+\alpha)(1+\cos\beta\cos\Delta\phi_m) \quad (2)$$

$$V_{DMOD} = \frac{V_o}{2}[V(-\Delta\phi_m) - V(\Delta\phi_m)] = \frac{V_o}{2}(1+\alpha)(\sin\beta\sin\Delta\phi_m) \quad (3)$$

Figure 6:
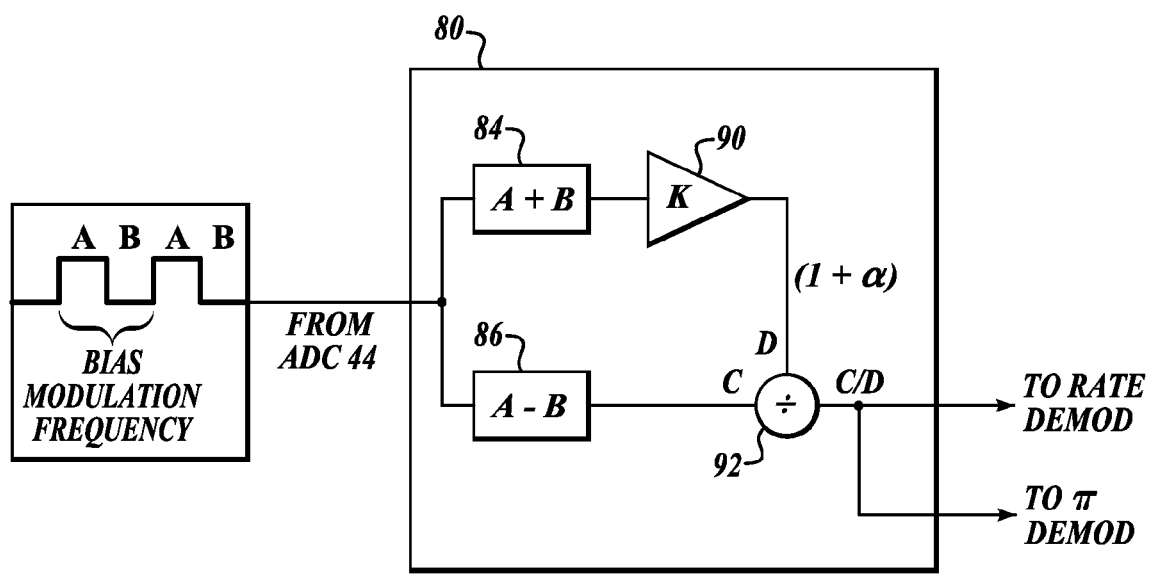
FIG. 6 illustrates a diagram of an example logic flow formed in accordance with the present invention.

Equation 2 (3) can be referred to A+B in 84 (A−B in 86) in FIG. 6. $V_{DMOD}$ and $V_{AVG}$ can be exactly measured and processed to solve for intensity modulation amplitude. In digital processing, the intensity modulation amplitude can be solved as shown in Equation (4).

$$\alpha = \frac{\frac{D_{AVG} - D_{DC}}{N_S 2^{BIT}} \times \frac{\Delta V_{ADC}}{\eta}}{\frac{V_o}{2}(1+\cos\beta\cos\Delta\phi_m)} \quad (4)$$

$D_{AVG}$: 2τ average of Detector Input
$D_{DC}$: Average of Detector Input
BIT: ADC Bit Depth
$\Delta V_{ADC}$: ADC Input Range
η: Front End Gain
Ns: Number of Samples The intensity modulation amplitude is used to rescale phase modulation signal from the demodulation signal to obtain gyro rotation rate free of vibration-induced error as shown in Equation (7).

$$V'_{DMOD} = \frac{V_{DMOD}}{1+a} \quad (5)$$

FIG. 6 is another illustration to stream line the processing of signals and summarize the mathematical calculation from Equations (1) to (5). The digital signal 82 sent by the ADC 44 to the component 80. The digital signal 82 includes a first amplitude A that is $V(-\Delta\phi_m)$ in Equations (2) and (3) and a second amplitude B that is $V(\Delta\phi_m)$. In the component 80, A is added to B at block 84 and B is subtracted from A at block 86. A gain K 90 is applied to the summation of block 84. The result of the difference of block 86 is divided by the output of the gain K 90 at a divider 92 following the formula Output= (A−B)/[1+K(A+B)]. The result of the divider 92 is sent to the rate and π demodulators.

It is easy to for those skillful in the art to realize the same vibration error suppression technique is also applicable to other gyro signals to rescale for correction of vibration-induced error. These signals include, but not limited to, phase modulation reference voltage, relative intensity noise monitor signal, eigen-frequency servo monitor signal, and carrier suppression modulation signal.

While the preferred embodiment of the invention has been illustrated and described, as noted above, many changes can be made without departing from the spirit and scope of the invention. Accordingly, the scope of the invention is not lim- The embodiments of the invention in which an exclusive property or privilege is claimed are defined as follows:

1. A method for performing vibration error suppression, the method comprising:
   receiving a modulated light signal at a photo detector from a sensing loop assembly;
   generating the received light signal into a modulated analog signal;
   converting the generated analog signal into a modulated digital signal;
   determining intensity modulation of the modulated digital signal;
   determining amplitude of the intensity modulation; and
   resealing the modulated digital phase signal based on the determined intensity modulation amplitude.

2. The method of claim 1, further comprising generating an analog modulation signal based on the re-scaled modulated digital signal and controlling the sensing loop assembly based on the generated analog modulation signal.

3. A system for performing vibration error suppression, the system comprising:
   a light source configured to generate a light signal;
   a sensing loop assembly configured to modulate and transmit the generated light signal in opposing directions in a fiber optic coil;
   a photo detector configured to receive a modulated light signal that is an output of the sensing loop assembly and generate an analog signal;
   a processing component configured to convert the generated analog signal into a modulated digital signal, determine intensity modulation of the modulated digital signal, determine amplitude of the intensity modulation, and re-scale the modulated digital signal based on the determined intensity modulation amplitude.

4. The system of claim 3, wherein the processor component is further configured to generate an analog modulation signal based on the re-scaled modulated digital signal and control the sensing loop assembly based on the generated analog modulation signal.

* * * * *

UNITED STATES PATENT AND TRADEMARK OFFICE
CERTIFICATE OF CORRECTION

PATENT NO.        : 7,715,014 B2
APPLICATION NO.   : 11/682669
DATED             : May 11, 2010
INVENTOR(S)       : Chen It is certified that error appears in the above-identified patent and that said Letters Patent is hereby corrected as shown below:

In the Specification

At Column 1, lines 7-11, replace "The invention described herein was made in the performance of work under U.S. Government Contract No. F29601003-C-0124, Air Force Research Laboratory (AFRL). The Government may have rights to portions of this invention." with --This invention was made with Government support under F29601003-C-0124 awarded by the Air Force Research Laboratories (AFRL). The Government has certain rights in the Invention.--

Signed and Sealed this
Fourteenth Day of October, 2014

Michelle K. Lee
*Deputy Director of the United States Patent and Trademark Office*